United States Patent [19]

Hueberger

[11] 4,445,655
[45] May 1, 1984

[54] KREUGER FLAP ACTUATING MECHANISM FOR DELTA WING, CANARD TYPE AIRCRAFT

[75] Inventor: Lawrence K. Hueberger, Reno, Nev.
[73] Assignee: OMAC, Inc., Reno, Nev.
[21] Appl. No.: 344,843
[22] Filed: Feb. 1, 1982
[51] Int. Cl.³ .............................................. B64C 3/50
[52] U.S. Cl. .................................. 244/214; 244/210; 244/219
[58] Field of Search ............... 244/214, 213, 219, 224, 244/75 A, 75 R, 210

[56] References Cited

U.S. PATENT DOCUMENTS 3,617,018 11/1971 Baetke ................................. 244/214
3,910,530 10/1975 James et al. ........................ 244/214

FOREIGN PATENT DOCUMENTS 223292 10/1924 United Kingdom ................ 244/214

Primary Examiner—Trygve M. Blix
Assistant Examiner—Ivy M. Shum
Attorney, Agent, or Firm—Sughrue, Mion, Zinn, Macpeak & Seas

[57] ABSTRACT

A Kreuger flap is hinge-mounted to the leading edge of an aircraft wing by a plurality of hinges hinged at one end internally of the wing, near its leading edge, and at the other end to the rear surface of the Kreuger flap. A torsion tube extending longitudinally through the wing over the length occupied by the Kreuger flap and to the rear of the hinge connection to the wing, is forcibly rotated by a single hydraulic cylinder connected to a crank arm fixed to and projecting radially from the torsion tube. A coil spring fixed at one end to the wing and at its opposite end to a second arm projecting radially from one end of the torsion tube, is moved overcenter during arm movement between first and second position during Kreuger flap extension and retraction and biases the Kreuger flap towards retraction. Toggle links connect the torsion tube to respective hinges with the toggle links also forming an overcenter mechanism for mechanically locking the flaps in projected position when the hydraulic cylinder drive terminates.

4 Claims, 5 Drawing Figures

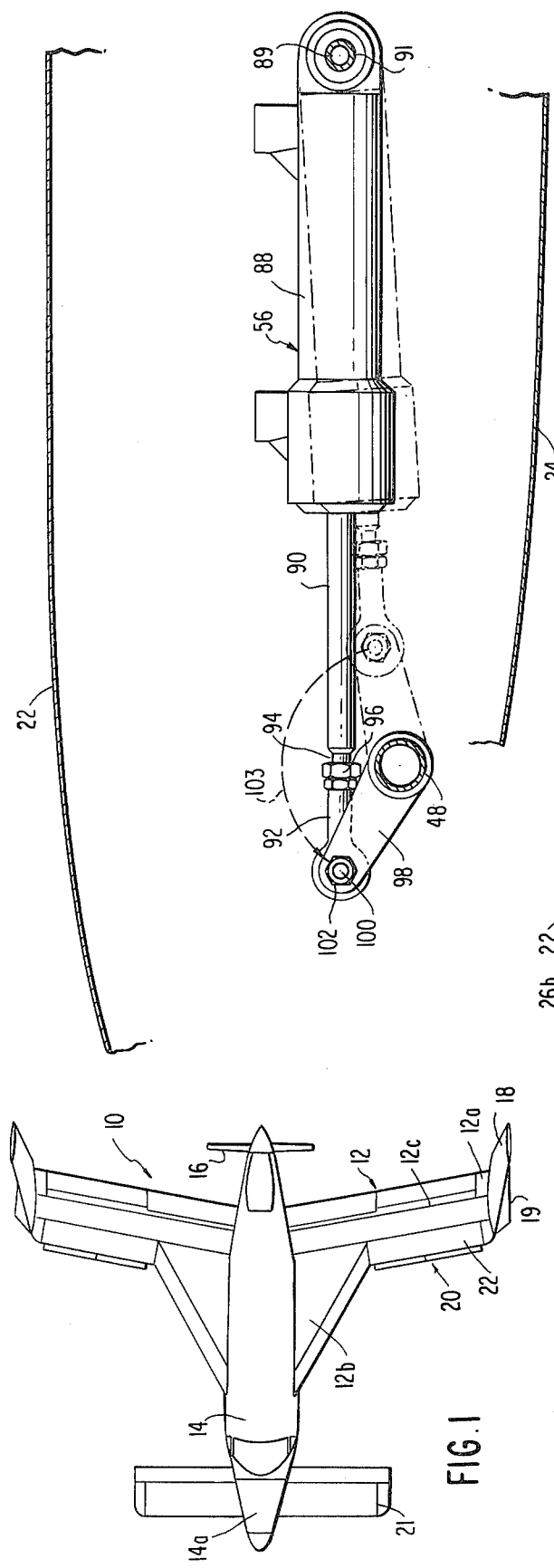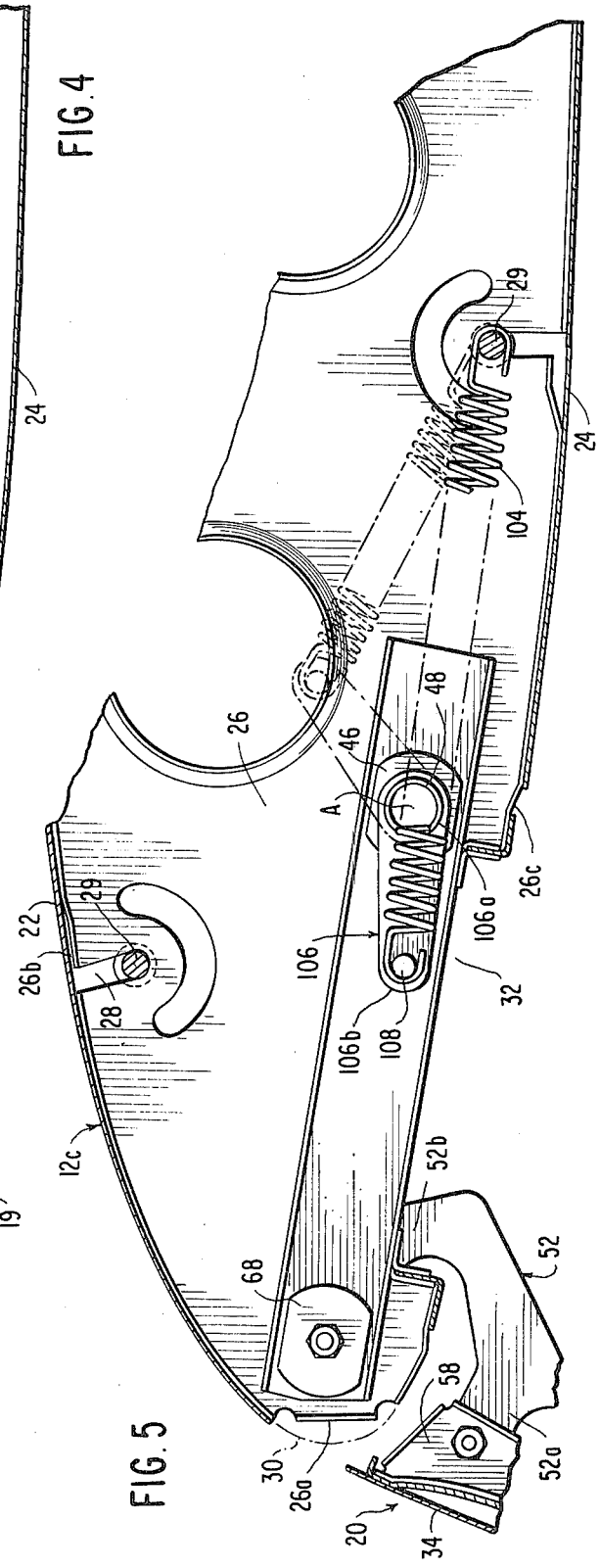

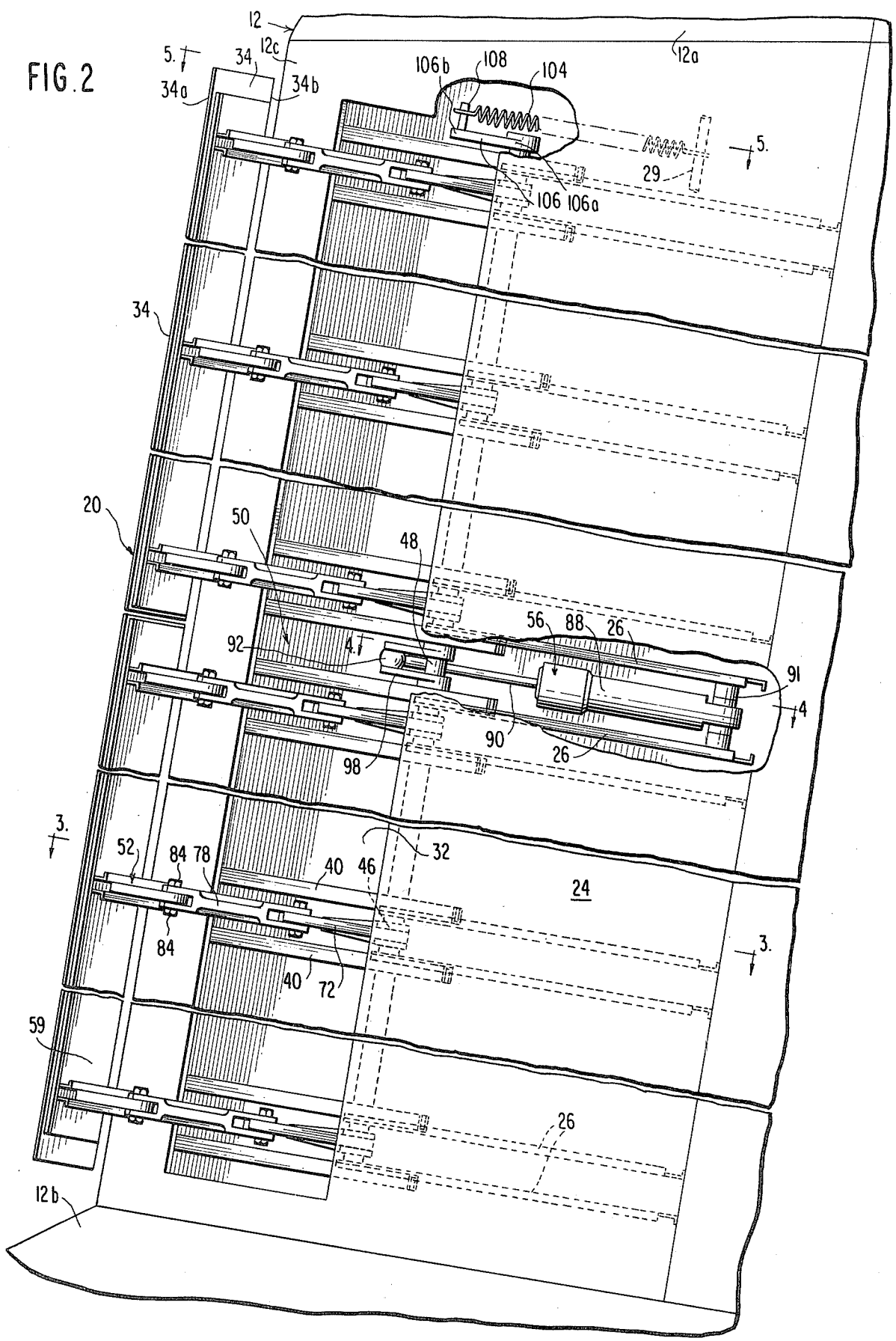

KREUGER FLAP ACTUATING MECHANISM FOR DELTA WING, CANARD TYPE AIRCRAFT

FIELD OF THE INVENTION

This invention relates to an actuating mechanism of simplified construction for operating Kreuger flaps mounted to the leading edge of wings projecting outwardly of an aircraft fuselage to each side thereof, and more particularly, to an simplified actuating mechanism particularly applicable to a light weight, delta wing, canard type aircraft.

BACKGROUND OF THE INVENTION

In order to impart additional lift to powered aircraft either for pleasure or business use, it is conventional to extend the air foil at the leading edge of the aircraft wing by means of a sheet like member or leading edge flap which folds outwardly from the bottom surface of the airfoil type wing, at its leading edge, and pivots to a position generally in line with the convex curvature provided to the wing at its upper surface such that the sheet like member functions as an extension to the leading edge of the wing itself, and acts as an extension of the upper lifting surface of the wing.

In larger, and thus heavier, aircraft, since the leading edge flap, known as a Kreuger flap, extends over a major distance of the leading edge of the wing, multiple motors have been employed for acting in concert to drive the Kreuger flap from its retracted position lying flush with and/or forming a portion of the lower surface of the wing, adjacent the leading edge thereof, to a projected position approximately 90° thereto, where the Kreuger flap forms a virtual extension of the convex upper surface of the wing.

As may be appreciated, it is desirable to maintain the aircraft structure as lightweight as possible to improve the fuel economy of the aircraft. Fuel economy is a very important factor, particularly due to the tremendous increase in cost of aircraft fuel as result of the world oil shortage over recent years. Additionally, Kreuger flap actuating mechanisms in the past are costly due to the utilization of multiple drive motors such as hydraulic cylinders for effecting flap movement between projected and retracted positions at the leading edge of the wing.

It is, therefore, a primary object of the present invention to provide an improved Kreuger flap actuating mechanism for a light aircraft which is positive in operation, which mechanism mechanically locks itself in both retracted and projected position, is spring biased towards retracted position and wherein a single drive motor may be employed for effecting movement of the Kreuger flap from extended to projected positions, and vice versa.

SUMMARY OF THE INVENTION

The present invention is directed to an aircraft wherein wings extend outwardly from each side of a fuselage and being of transverse airfoil configuration to provide lift to the aircraft and having a frontal leading edge and a rear trailing edge. The airfoil configuration is formed by a generally convex upper surface and a convex lower surface at the leading edge of the wing. A leading edge flap is mounted to the lower convex surface of the wing adjacent the leading edge thereof for pivoting between a first, retracted position in line with the lower convex surface of the wing and a second, projected position where the leading edge flap is generally in line with the upper convex surface of the wing at the leading edge and forms an extension of that convex surface for added lift during aircraft take off and landing.

The improvement comprises a torque tube extending generally the length of each wing portion bearing the leading edge flap and mounted for rotation about its axis, internally of the wing and to the rear of the wing leading edge. A plurality of hinges mounted at one end within the wing, at the leading edge, and forward of the torsion tube are fixed to the inside surface of the leading edge flap at their other end. Means are provided for mechanically linking the torque tube to the leading edge flap through the hinges such that during limited rotation of the torque tube about its axis in one direction, the leading edge flap is pivoted from retracted position to the projected position, while rotation in the opposite direction effects movement of the leading edge flap from the second position to the first position. A single motor is operatively coupled to the torque tube for rotating the torque tube bidirectionally about its axis and biasing means is connected to the torque tube to bias the torque tube in a direction tending to retract the leading edge flap.

Preferably, single motor means and the biasing means are operatively connected to opposite ends of the torque tube. The motor means may comprise a single hydraulic cylinder for each leading edge flap including a piston rod projecting outwardly from one end of the cylinder and operatively connected to the torque tube through a crank arm fixed to the torque tube and projecting radially outwardly therefrom, to which its pin is connected. The biasing means may comprise a coil spring fixed at one end to the wing internally of the airfoil surfaces and at its opposite end to a second arm fixed to the torque tube and projecting radially outwardly therefrom. Preferably, the coil spring functions in connection with the second arm to form one overcenter mount. The coil spring is mounted to the end of the crank arm such that during rotation of the torque tube, the connection between the coil spring and the crank arm passes through a centerline between the axis of rotation of the torque tube and the mounting point of the coil spring at its end remote from the second crank arm to form a first overcenter mechanism. Further, the mechanical means linking the torque tube to the hinges, at each hinge location, preferably comprises a toggle link assembly including a linkage arm fixed to and extending radially outwardly of the torque tube and a second link, pin connected at respective ends to the link arm and the hinge. The toggle linkage is arranged to function as a second overcenter mechanism for mechanically locking the leading edge flap at extended position after being driven thereto by operation of the hydraulic cylinder.

BRIEF DESCRIPTION OF THE DRAWINGS

FIG. 1 is a top plan view of a pusher, delta wing, canard type aircraft employing the improved leading edge flap actuating mechanism forming one embodiment of the present invention.

FIG. 2 is a bottom plan view of the portion of one wing of the aircraft of FIG. 1, with the leading edge flap in projected position.

FIG. 4 is a vertical sectional view of a portion of the wing illustrated in FIG. 2 taken about line 4—4, illustrating the coupling of the single hydraulic cylinder to the torque tube for effecting pivoting of the leading edge flap from retracted to extended position and vice versa.

FIG. 5 is a further sectional view taken about line 5—5 for the wing, FIG. 2, illustrating the mounting of the single coil spring for biasing the leading edge flap to retracted position.

DESCRIPTION OF THE PREFERRED EMBODIMENT

Figure 3:
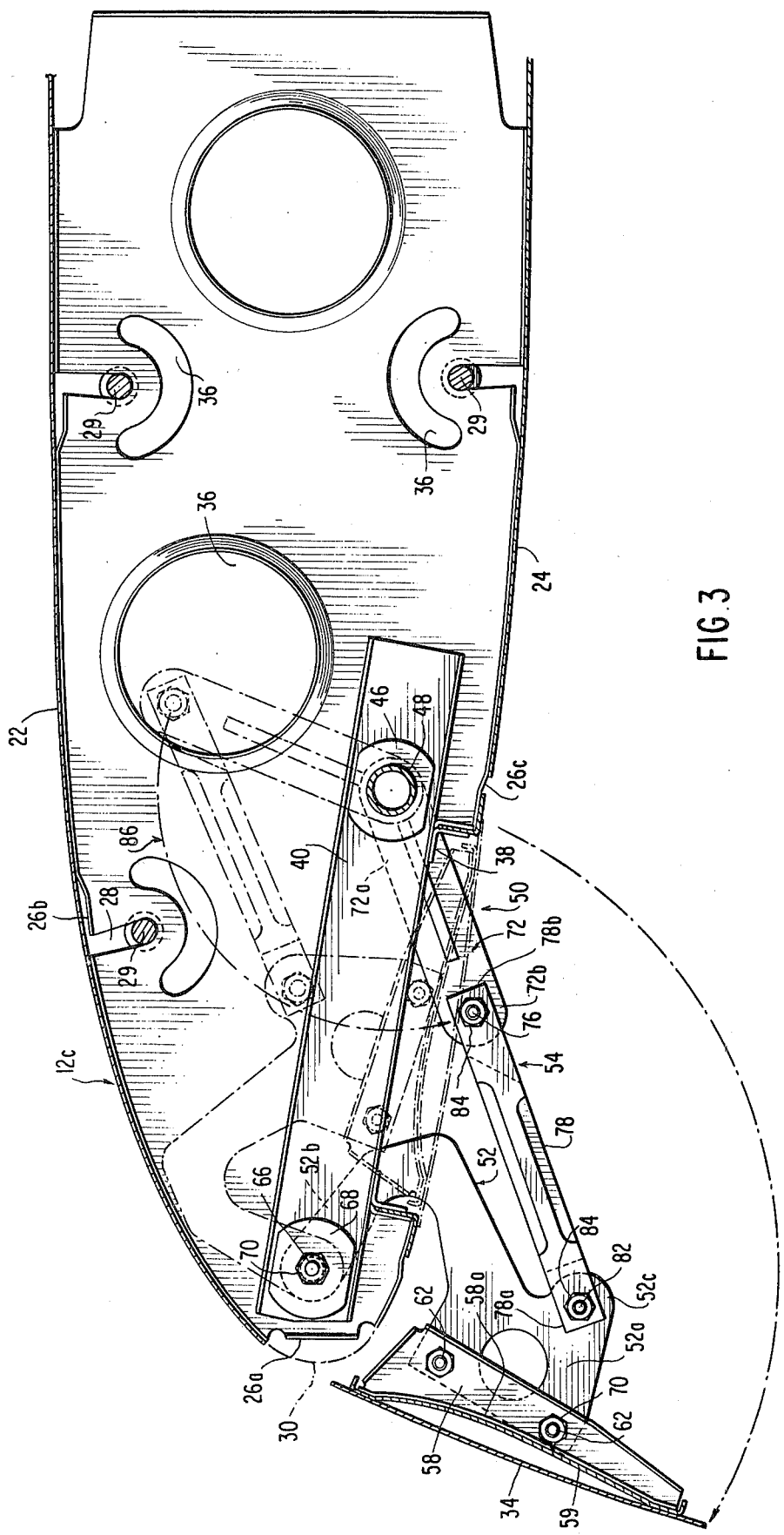
FIG. 3 is a vertical sectional view of a portion of the wing illustrated in FIG. 2 taken about line 3—3, illustrating the hinge mounting of the leading edge flap to the aircraft wing at one of several hinge mounting positions.

Referring to the drawings, there is shown in FIG. 1, in top plan view, a pusher, delta wing, canard type aircraft indicated generally at 10, characterized by a pair of delta wings indicated generally at 12 which extend outwardly from respective sides of a fuselage 14. Fuselage 14 bears, at its aft end, a prop 16 for pushing the aircraft through the air. The delta wings 12 terminate at their outboard ends remote from fuselage 14 in paired, upper and lower winglets as at 18 and 19 of airfoil configuration which project respectively, upwardly and outwardly, and downwardly and outwardly of the wing 12 from outboard end 12a. Further, an inboard section 12b of each aircraft wing 12 provides increased lifting surface to the wing and sweeps back at a relatively extreme angle, approximately 65° to the longitudinal axis of the aircraft fuselage 14. Each wing 12 includes a main outboard section 12c, which is nearly perpendicular to the axis of the aircraft fuselage. Canards 21 form horizontal lifting stabilizers near nose 14a of fuselage 14.

Extending over the major portion of the length of section 12c of each aircraft wing 12 at its leading edge and forming a portion of that section is a Kreuger or leading edge flap indicated generally at 20.

It is to the actuating mechanism for the leading edge flap 20 that the present invention is directed. As may be appreciated, since the leading edge flap 20 extends almost the full length of the section 12c, regardless of whether the aircraft is a light, small business, or personal aircraft, as in the case to which the invention is shown, the flap is of extended length, is in two sections and must be pivoted or moved from a retracted position where it lies flush with or forms a portion of the lower surface 24 of wing 12 to a position where it is extended approximately 90° thereto and wherein it functions as an extension of the upper convex airfoil surface 22 of the aircraft wing 12 to provide increased lift to the wing 12 during aircraft take off and landing.

As may be appreciated further by reference to FIG. 2, which is a bottom plan view of the portion 12d of the aircraft wing 12 which bears the Kreuger or leading edge flap 20, the present invention is directed to a simplified actuating mechanism for flap 20. This includes the hinge mounting of the flap 20, the connection between the flap and the actuating hydraulic cylinder or motor for pivoting the flap from the full line extended or projected position FIG. 3 and the dotted line retracted position (and vice versa) and the biasing means tending to bias the leading edge flap 20 to retracted position in line with and forming part of the lower concave airfoil surface 24 of wing portion 12d.

The wings 12 are constructed in conventional fashion by the utilization of a plurality of longitudinally spaced ribs 26 of airfoil configuration and constituting thin planar sheet metal elements comprised of a leading edge 26a, an upper edge 26b of convex airfoil configuration as well as a lower edge 26c of convex airfoil configuration. The ribs are spaced from, but fixedly connected to each other by way of longitudinally extending stringers 29 or the like which are mounted within openings or slots as at 28 within these elements. As may be appreciated, the wing structure as well as the rest of the aircraft superstructure is formed as an open, rigid framework over which mounts thin metal sheets which are riveted, welded or the like to the framework and/or themselves at their edges so as to provide an outer imperforate skin defining in the case of section 12c of the wing the upper convex airfoil surface 22 and the lower outwardly convex airfoil surface 24. The nose 30 of wing section 12c is shown in a dash/dot line as at 30, FIG. 3, and is comprised of a de-icing assembly functioning to prevent build up of ice on airfoil surfaces 22, 24 during flight under adverse weather conditions. Nose 30 conforms to the airfoil configuration desired for the wing and aids in lift and other flight characteristics to the aircraft.

As may be appreciated, the lower, outwardly convex, airfoil surface 24 bears a rectangular elongated opening as at 32 to permit retraction of the flap 20 within the wing proper on the under surface of the same and to the rear of the nose 30 of the wing. Each leading edge flap or Kreuger flap 20 comprises two end to end generally thin elongated rectangular metal strips 34 slightly oversized with respect to opening 32 such that leading edge 34a and trailing edge 34b extend beyond opening 32 when flap strips 34 close off that opening 32 during flap retraction. The leading edge flaps are sectioned to reduce stress build-up.

The ribs 26 typically bear openings or holes such as 36 to lighten these members without reducing strength, some of the holes being of circular configuration and others comprising arcuate slots. The opening 32 at ribs 26 is defined by a modified rectangular recess 38 formed within the lower edge 26c of each rib, the recess 38 being of a sufficient depth to permit the flaps 20 to be retracted to the dotted line position, FIG. 3. Across the back of recess 38 there extends, at each rib 26 where a hinge is mounted, a narrow, thin metal reinforcing strip 40 which is tack welded to rib 26 along its length to strengthen the rib 26 and to each side thereof. A hole is formed within the strip 40 and rib 26, at each rib location along the length of the wing occupied by Kreuger flap 20, and mounted within the holes, at each location, are bushings 46. Each bushing 46 is of cylindrical form and functions to rotatably mount a tubular metal torsion tube 48. The torsion tube, therefore, is mounted within the wing just to the rear of and above recess 38 and extends generally parallel to the leading edge of the wing section 12c. The torsion tube 48 functions as a main element of leading edge flap actuating mechanism, indicated generally at 50, and further comprising a plurality of hinges indicated generally at 52, toggle link assemblies indicated generally at 54, and a single hydraulic cylinder indicated generally at 56 in the form of a linear fluid motor for pivoting the leading edge flap 20 between the full line projected position, FIG. 3, and the dotted line retracted position for that member.

Flap 20 bears on the inside surface 34a of metal strip 34 and fixed thereto at longitudinally spaced positions, bridge members 58 functioning to rigidify the metal strip 34 and permit attachment of hinge 52, at that location, to the flap 20. Each bridge member 58 is tack welded along one face to the rear face of a curved metal strip 59, whose leading and trailing edges are welded or riveted to flap strips 34. Each bridge member 58 includes paired holes along the length of this member through which project bolts 62 for rigidly mounting the end of one leg 52a of the hinge 52. Each hinge 52 is generally of irregular V-shape including legs 52a and 52b which extend at some angle to each other. Leg 52b is provided with a hole at its outboard end, through which projects a pivot pin 66 for pin connecting of leg 52b of the hinge to rib 26 just rearwardly of nose 30. The pivot pin 66 also projects through a bushing 68 forming a bearing and fixed to the side of rib 26 via reinforcing strip 40.

Lock nuts as at 70 are provided to each end of the pivot pin 66 and bolts 62. Pin 66 connects leg 52b of each hinge 52 to a given rib 26 but permits rotation of the hinge 52 about the pin axis.

As may be appreciated, the configuration of the hinges 52 are such that the hinges are fully accommodated within the interior of the wing when the leading edge flap 20 is pivoted from its full line projected position as shown, FIG. 3, to the dotted line position, when the flap is in retracted position.

At each hinge location, normally sandwiched between given ribs 26, hinge 52 is linked to the torsion tube 48 such that upon rotation of the tube 48, the leading edge flap 20 is pivoted between its retracted and projected positions, or vice versa. In that respect, a first link 72 of the toggle link assembly 54 has its one end 72a rigidly welded to the torsion tube 58 such that its opposite end 72b projects radially outward therefrom. The link 72 takes the configuration of a thin, reinforced forging and bears a hole at its outboard end 72b. A second forged link 78 is pin connected at opposite ends to link 72, via pin 76, and hinge leg 52a, via pin 82. Hinge 52 includes, within leg 52a, a projection or shoulder 52c which bears a small hole receiving pin 82. Second link 78 is forged with clevises at 78a, 78b at its ends. Clevis 78a receives the shoulder or projection 52c and the clevis bears aligned holes through which pivot pin 82 projects. Again, lock nuts or suitable fasteners as at 84 are provided to each end of the pivot pins 76, 82, to prevent disconnection of the clevis joint. Clevis 78b receives within its slot the outboard end 72b of link 72 and is pin connected thereto by means of pivot pin 76. Lock nuts 84 act in the same manner as at clevis 78b, threaded to the opposite ends of pin 76.

Under this arrangement, with the links 72, 78 are properly sized lengthwise, and connected to each other and to torsion tube 48 and hinge 52, when the Kreuger flap 20 strips 34 are in the full line, projected position, FIG. 3, and functioning as a continuation of the airfoil provided by the upper wing airfoil surface 22, to add lift to the aircraft wing, the links 72 and 78 move slightly past an axial in line position, thus links 72, 78 form a first overcenter mechanism.

Torsion tube 48 is driven between two extreme angular positions as evidenced by arc 86, FIG. 3, in this case approximately 120°. During retraction, link 78 pivots about pivot pins 76, 82 at each end to insure that the hinge 52 is retracted fully within the opening 32 at the bottom of the aircraft wing. This causes the links 72 and 78 to swing towards each other as indicated in dash-dot lines, and back, overcenter, FIG. 3. When retracted, the sheet metal strips 34 forming the Kreuger flap airfoil extension surface are pulled into alignment with the bottom surface 24 of the wing at section 12c of the wing and complements surface 24 in providing a desired airfoil configuration and closed surface bottom to each aircraft wing.

In order to effect actuation of the leading edge flap 20, in the simplified but highly effective mechanism of the present invention, a single hydraulic cylinder 56 is employed. The hydraulic cylinder 56 is mounted within the interior of each wing, at or near the center of section 12c of the wing. Each hydraulic cylinder is conventional and comprises a linear hydraulic motor including an elongated cylindrical casing 88 which is pivotably mounted to the wing at one end via transverse pin 89 and bushings 91 so that its axis is generally horizontal. It is preferably mounted so as to be generally in line with the longitudinal axes of ribs 26 and between given ribs 26, FIG. 2. The hydraulic cylinder bears internally, a piston (not shown) mounted to one end of a piston rod 90 which rod bears at its outboard end a threaded connector as at 92 and which may be threadably adjusted longitudinally on the piston rod and locked thereto since the rod bears at its projecting, outboard end threads 94. Lock nut 96 also threadably mounted to the threaded portion of the piston rod 90 permits locking of the threaded connecter 92 at a desired axial position on the threaded portion 94 of piston rod 90.

Further, the torsion shaft 48 at its longitudinal center fixedly bears a pair of radially projecting crank arms 98 which are fixed to and project radially outward of the torsion bar 48. Each crank arm 98 is of rectangular strip configuration and is relatively thin to facilitate pin coupling at its outboard end to connector 92. A pin connection is made between the outboard end of crank arm 98 and the threaded connector 92 by pin 100. The pin 100 may bear at opposite ends lock nuts as at 102 to prevent disconnection between these members. Dual crank arms 98 are preferably employed to respective sides of piston rod 90 and connector 92.

As may be appreciated, the hydraulic cylinder is operative such that its piston (not shown) is driven towards one end or the other by the application of hydraulic fluid under pressure to one side of the piston or the other. This action is conventional and in order to effect pivoting of the leading edge flap 20 from retracted to projected position, fluid pressure is applied to the right side of the piston (not shown), FIG. 4, forcing rod 90 to project outwardly of cylinder casing 88 into the full line position and causing the piston rod and its threaded connector 92 to shift to the full line position shown from the dotted line position. Crank arm 98 is therefor pivoted, FIG. 4, approximately 120°, as indicated by arrow 103, resulting in that rotation of the torsion tube 48 and resulting in the toggle linkage 50 shift overcenter, just past the in-line position with the Kreuger flap projected outwardly from the lower surface of the aircraft wing.

Preferably, a biasing force assisting retraction of the leading edge flap 20 after moving to the projected position and at the termination of take off or landing is employed via one or more coil springs 104, FIG 4. Only one coil spring 104 is shown as connected, at one end, to a further radial arm 106 whose inner end 106a is welded or otherwise rigidly fixed to the axial outboard end 48b of torsion tube 48. Arm 106 bears a pin 108 at its outboard end 106a which projects to one side thereof. Pin 108 mounts one end of coil spring 104 while the opposite end of coil spring 104 is fixed to a stringer 29 internally of wing section 12c and at a position such that the coil spring 104 is forced to move through the torsion tube pivot axis A, FIG. 5, when the arm rotates between extreme angular positions, in either direction, during hydraulic cylinder operation. When the piston rod retracts into the cylindrical casing 88 to positively drive the leading edge flap 20 from projected to retracted position and vice versa, the spring biasing assembly functions under the overcenter principle such that the spring must be further extended against its own bias during the initial retracting movement of the Kreuger flap of the leading edge flap 20. However, during the major portion of the rotation of torsion tube 48 during flap retraction, the biasing force decreases and the coil spring 104 compresses under tension functioning to facilitate movement of the leading edge flap 20 to dotted line retracted position, FIG. 3. When the flap is projected, the spring initially extends fully, then relaxes slightly as the spring again passes over the center. A second coil spring 104 may be similarly connected to the end of torsion tube 48 to the opposite side of hydraulic cylinder 56 from that just described.

By reference to FIG. 2, it is noted that the leading edge flap 20 is in two sections including end-to-end adjacent strips 34, each pivotably mounted to wing section 12c via three hinges 52 and actuated via three toggle link assemblies 54, however the toggle link assemblies 54 are all connected to the same torsion tube 48 which, in turn, is mechanically operated by a single hydraulic cylinder 88 connected via paired crank arms 98 to the center of torsion bar 48. Power is therefore applied uniformly over the longitudinal extent of the leading edge flap 20 through the six toggle link assemblies. A biasing force is exerted at the outboard end of the torsion bar 48 remote from power application at the center of the bar 48. If necessary, a duplicate coil spring biasing connection made to the inboard end of torsion bar 48 to the opposite side of hydraulic cylinder 88, FIG. 2, from the one illustrated in that view.

While the invention has been particularly shown and described with reference to a preferred embodiment thereof, it will be understood by those skilled in the art that various changes in form and details may be made therein without departing from the spirit and scope of the invention.

What is claimed is:

1. In an aircraft having wings extending outwardly from each side of an aircraft fuselage and being of transverse airfoil configuration to provide lift to the aircraft and having a frontal leading edge and a rear trailing edge, and wherein the airfoil configuration is formed by a generally convex upper wing surface and a lower wing surface at the leading edge of the wing, and wherein a leading edge flap is mounted to the wing adjacent the leading edge thereof for pivoting between a retracted position in line with the lower surface of the wing and a projected position where the leading edge flap forms an extension of the airfoil convex upper surface of the wing for added lift during aircraft take off and landing, the improvement comprising:

a torque tube extending parallel to and generally the length of each wing portion bearing the leading edge flap and mounted for rotation about its axis internally within the wing and to the rear of the wing leading edge, a plurality of hinges rotatably mounted within the wing adjacent the leading edge, forward of the torsion tube, and fixed at one end to the rear surface of the leading edge flap at one end, means mechanically linking the torque tube to the hinges such that during rotation of the torque tube about its axis, the flap is pivoted from retracted position to projected position and vice versa, a motor operatively coupled to said torque tube for rotating said torque tube bidirectionally about its axis, biasing means connected to said torque tube for biasing said torque tube in a direction tending to retract the leading edge flap, said biasing means comprising a coil spring, a second arm fixed to said torque tube and projecting radially outwardly therefrom at an axial position spaced from said motor, and wherein said coil spring is fixed at one end to said wing and at its other end to the radially outboard end of said second arm, and wherein said second arm is angularly positioned on said torque tube and said coil spring is fixed at opposite ends to said wing and to said second arm at positions such that during rotation of said torque tube, the axis of said coil spring passes through the axis of rotation of said torque tube such that said coil spring and said second arm function as a first overcenter mechanism tending to maintain the leading edge flap at projected position when said leading edge flap is driven to projected position absent further operation of said motor tending to drive the leading edge flap towards retracted position.

2. The aircraft as claimed in claim 1, wherein said motor is a single motor and said biasing means are operatively connected respectively to the center and end of said torque tube.

3. The aircraft as claimed in claim 1 or claim 2, wherein said motor comprises a single hydraulic cylinder mounted within the wing and includes a piston rod projecting outwardly from one end of said cylinder at right angles to the axis of said torque tube, and a crank arm is fixed to said torque tube and projects radially outwardly therefrom and is pin connected at its outboard end to the end of said piston rod, such that retraction and projection of said piston rod causes said torque tube to rotate between positions effecting retraction and projection of said leading edge flap.

4. The aircraft as claimed in claim 1, wherein the means mechanically linking the torque tube to the hinges comprises paired toggle links including a first link arm fixed at one end to said torque tube and extending radially outwardly thereof, and a second link pin connected at respective ends to the radially outboard end of said first link arm and said hinge, and wherein said first linkage arm is circumferentially fixed to said torque tube at a position, and said first linkage arm and said second link are of such length and are pin connected to each other, and said second link pin connected to said hinge at positions such that when said leading edge flap is driven to said projected position, said first link arm and said second link move past axial alignment therebetween such that said first link arm and said second link define a second overcenter mechanism tending to maintain the leading edge flap in projected position along with said first overcenter mechanism.

* * * * *